Figure 1:
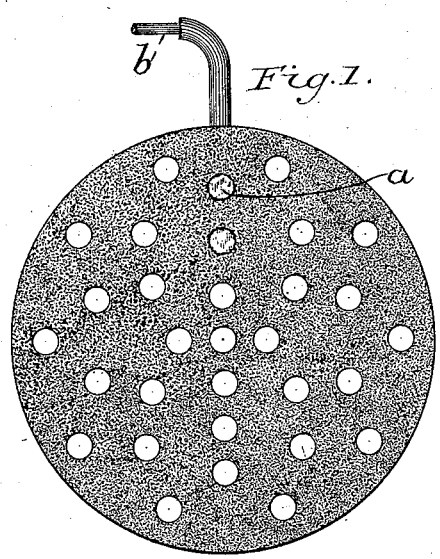

(No Model.)

E. T. STARR.
ELECTRODE FOR ELECTRIC BATTERIES.

No. 290,941. Patented Dec. 25, 1883.

WITNESSES:
Wm A. Skinkle
H. W. Elmore.

INVENTOR:
Eli T. Starr,
By his Attorneys
Baldwin, Hopkins & Peyton.

UNITED STATES PATENT OFFICE.

ELI T. STARR, OF PHILADELPHIA, PENNSYLVANIA, ASSIGNOR OF ONE-HALF TO H. M. LEWIS AND JAMES W. WHITE, BOTH OF SAME PLACE, AND WILLIAM J. PEYTON, OF WASHINGTON, DISTRICT OF COLUMBIA.

ELECTRODE FOR ELECTRIC BATTERIES.

SPECIFICATION forming part of Letters Patent No. 290,941, dated December 25, 1883.

Application filed October 20, 1882. (No model.)

*To all whom it may concern:*

Be it known that I, ELI T. STARR, of the city and county of Philadelphia, in the State of Pennsylvania, have invented certain new and useful Improvements in Electrodes for Electric Batteries, of which the following is a specification.

My invention relates more particularly to electrodes or elements for electric batteries of the class commonly known as "secondary" or "storage" batteries. These batteries generate no electricity of themselves, but when submitted to the action of an electric current from a suitable generator passing through them they become charged or put into condition to give off electric currents or energy upon connecting their electrodes by a conductor.

The object of my invention more particularly is to improve secondary-battery elements by giving them large active surface within comparatively small space and with diminished weight, and, further, to cheapen the cost and simplify the manufacture of the elements.

The subject-matter claimed is particularly pointed out at the close of the specification.

In order to carry my improved method of constructing secondary-battery elements into effect, and to produce an improved electrode or element constructed according to my invention, I take finely-divided lead—such as thin lead shavings or particles—and either mix it with oxide of lead or coat the lead particles superficially with oxide by submitting them, for instance, to the action of an electric current in well-known ways. This finely-divided lead, or lead particles and oxide, constitutes the active and also the electro-conducting portions of the element. It is to be understood, however, that other finely-divided active material suitable for secondary batteries may be employed instead of the lead and oxide—for instance, the oxide or the peroxide alone; but the claim which I make herein at the close of the specification is intentionally and definitely limited to lead or a lead compound as the active material of the element, as I have found, after much study and experiment, that lead or a lead compound is peculiarly and particularly efficient and desirable in connection with a non-active binding agent, as described by me, when used as a secondary element.

The active material is thoroughly mixed with a proper proportion (hereinafter indicated) of some non-active binding material—such as shellac, beeswax, rosin, sulphur, or some such similar non-active material—which requires the action of heat or of a solvent to convert it into a soft or liquid form, and which upon cooling or evaporation or volatilization of the solvent becomes "set" or hard, so as to be self-sustaining as a mass. The non-active material is used solely as a binding agent for the active material, so as to enable the finely-divided active material to be converted into a porous self-sustaining mass, presenting an electro-conducting body having large active surface, such extent of surface being requisite for accumulating a large amount of energy. A plain plate or sheet of lead or other metal as a secondary-battery element is practically defective, in that its surface, which is chemically affected, is limited in proportion to its weight; hence the utility of providing an element of comparatively small weight and compass with large active surface or surfaces to be chemically affected under the action of an electric current traversing an electrolytic fluid in the battery-cell. The proportion of the active material to the non-active binding material will generally be about in the ratio of two-thirds, in bulk, of active material to one-third of binding material; but the proportion of the active material to the non-active or binding material may be widely varied, while still affording good results. The proportion, however, of the active material should always be sufficient to allow of the active particles being in contact throughout the mass, as the area of conductivity of the element will be dependent upon such contact of the electro-conducting active particles.

The active material may be mechanically mixed with the non-active binding material prior to bringing the latter to a plastic or fluid form. Upon submitting such a mixture to the action of heat, when necessary, in converting the non-active material to a fluid form, the active material will be so encompassed and bound throughout its mass by the fluid material that upon cooling and setting or hardening said non-active material will bind the active material into a self-supporting mass suitable for a secondary-battery element. On the other hand, the non-active binding material may be first brought to a fluid state by heat or by a solvent and then have the active material thoroughly mixed or incorporated with it, and in such case the mixture will become set or hard upon cooling, or, in case a solvent is used, upon the evaporation or volatilization of the solvent. In either case, when heat is used, before the conglomerated mass has cooled, I place the mass, or so much thereof as may be required to make an element, in a mold of the desired form and subject it to pressure sufficient to compact it and make it conform to the shape required. The mass, upon cooling, is removed from the mold, and will be found to be a firmly-coherent self-sustaining body, the active material being firmly bound together by the non-active binding material of the mass. After the electrode has been constructed, the non-active binding material is cut out of or removed from the surface of the element by an appropriate solvent that will not affect the active material. If, for instance, the finely-divided active material has been bound together by gum-shellac, the shellac on the surface of the element may be cut out or removed with alcohol or with a hot solution of soda-water, and thereby a large surface of the active material will be exposed to be affected by the electrolytic action of the charging-current, by which the battery is put into condition to give forth electric energy.

The binding agent is preferably a material insoluble in water or dilute sulphuric acid, or, in other words, in the usual fluid of a battery-cell; and in the construction of my improved electrodes preferably only the binding agent at the surface of the electrodes is removed, as above indicated, to more thoroughly expose the active particles, and consequently a large active surface. In some cases, however, the soluble binding agent need not be wholly insoluble in the fluid of the battery, because upon repeatedly charging and discharging the electrodes in the process of forming and in using them the active material acquires the property of holding itself together, or, in other words, becomes set or self-sustaining to a large degree.

In molding the electrodes, they are preferably provided with a large number of holes or openings extending through them from side to side, for the free circulation of the electrolytic fluid of the cell, and for the more ready action of the accumulating forces upon the element.

I have thus described the best ways now known to me of constructing a secondary-battery element of a mixture of finely-divided active material with a non-active binding material, which acts to bind the active material into a firmly-coherent self-sustaining body when the non-active binding material cools or sets and hardens after being brought to a fluid condition by the action of heat or of a solvent.

The conducting-connection of my improved electrode may be made by drilling a hole in the mass at one or more of its edges. The effect of the drilling is to stretch the lead particles acted upon by the drill, and close or substantially close the interstices which may exist between them, whereby a continuous lead or metallic conducting-surface is provided for the connection. The conducting-connection—a wire, for instance—is placed in the hole or holes thus drilled, and is locked therein by packing the opening around the wire with an amalgam—for instance, such as an amalgam of silver, lead, and mercury—and also by packing the amalgam into holes which may be formed in the electrode to intersect that in which the connecting-wire is inserted. A perfect contact of the conducting-wire with the electrode is thus provided by the amalgam connection, which is a better conductor than the electrode, and oxidizing of the joints between the surfaces of the electrode and connection is effectually prevented.

Figure 2:
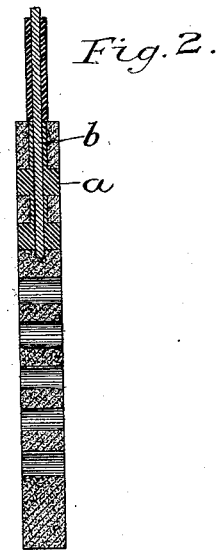

In the accompanying drawings, at Fig. 1 I have shown one of my improved electrodes with a series of holes extending through it, the amalgam connection $a$ between the electrode and its conducting-wire $b$ being also shown, and at Fig. 2 I have shown a sectional view through the electrode shown in Fig. 1. I have shown the electrode of circular or disk form; but of course it will be understood that the shape is immaterial, a flat rectangular plate being desirable in some instances.

I mean by "non-active binding agent," as used in this specification, a binding agent which is not chemically affected by the charging of the battery, the metallic matter being for that purpose.

I reserve the right hereafter to file an application or applications for all the patentable subject-matter disclosed in this patent, not specifically claimed herein; and this reservation is in no wise affected by the making and erasing of claims during the pendency of the application upon which this patent was granted. The matter claimed and erased is reserved as subject-matter for future application, as well as that which was not particularly claimed.

The subject-matter claimed in this present case is limited to that particularly recited in the following claim; and I here disclaim in favor of my prior application filed July 24, 1882, any and all patentable subject-matter common to said application and this present case which is not specifically claimed herein.

I may add that the process described herein of constructing battery-electrodes, consisting in mixing finely-divided active material with a non-active binding agent brought to a fluid or plastic condition by the action of heat, molding the mixture into shape before it cools or hardens, and hardening the mixture by cooling to bind the active matter together to form an electrode having active particles exposed to the battery-fluid, together with the process set forth which involves the further step of molding the mixture under artificial pressure, is or are claimed by me in an application filed December 5, 1883, as a division of this present case, such division being filed upon the demand of the Patent Office to that effect.

I claim as my invention—

A secondary-battery element constructed of a conglomerate mixture of finely-divided lead or lead compound with a non-active binding agent, substantially as described.

In testimony whereof I have hereunto subscribed my name this 16th day of October, A. D. 1882.

ELI T. STARR.

Witnesses:
  WM. J. PEYTON,
  E. EUGENE STARR.